(12) United States Patent
Bulteau

(10) Patent No.: US 7,030,362 B2
(45) Date of Patent: Apr. 18, 2006

(54) OPTOELECTRONIC DEVICE FOR METER OPTICAL DETECTOR MODULE

(76) Inventor: Serge Bulteau, Les Blondets 69840, Julienas (FR)

( * ) Notice: Subject to any disclaimer, the term of this patent is extended or adjusted under 35 U.S.C. 154(b) by 15 days.

(21) Appl. No.: 10/791,364

(22) Filed: Mar. 1, 2004

(65) Prior Publication Data
US 2004/0217265 A1 Nov. 4, 2004

(30) Foreign Application Priority Data
Mar. 4, 2003 (FR) .................... 03 02643

(51) Int. Cl.
*H01L 31/00* (2006.01)

(52) U.S. Cl. .................... 250/214.1; 250/551

(58) Field of Classification Search ........... 250/214.1, 250/551, 236, 214 R, 214 A, 222.1; 340/555–557; 330/59; 348/300, 707
See application file for complete search history.

(56) References Cited

U.S. PATENT DOCUMENTS

| 5,134,304 A | 7/1992 | Tanigawa et al. ........... 250/214 |
| 6,512,217 B1* | 1/2003 | Kameshima ............. 250/208.1 |

FOREIGN PATENT DOCUMENTS

EP 0366619 5/1990 ............... 19/175

OTHER PUBLICATIONS

French Search Report dated Nov. 3, 2003, FA 631769, FR 0302643.

* cited by examiner

*Primary Examiner*—Seung C. Sohn
(74) *Attorney, Agent, or Firm*—Sofer&Haroun, LLP

(57) ABSTRACT

An optoelectronic device for use in an optical detector module of a meter comprising a rotary member having a reflective sector comprises a voltage edge source, a sender comprising a light-emitting diode emitting a light pulse in response to a current pulse, a receiver, and a voltage source. The sender comprises a capacitor and a resistor connected on one side to the voltage source and the capacitor is connected on one side to the voltage edge source and on the other side to the other side of the resistor and to the anode of the light-emitting diode.

8 Claims, 2 Drawing Sheets

OPTOELECTRONIC DEVICE FOR METER OPTICAL DETECTOR MODULE

RELATED APPLICATION

This application is related to and claims the benefit of priority from French Patent Application No. 03 02643, filed on Mar. 4, 2003, the entirety of which is incorporated herein by reference.

FIELD OF THE INVENTION

The present invention relates to an optoelectronic device for an optical detector module of a meter, in particular a fluid meter, for example a water meter, for remotely measuring the consumption of said meter or carrying out equivalent logging or alarm operations.

DESCRIPTION OF THE PRIOR ART

A meter may be provided with an optical detector device comprising a visible consumption indicator taking the form of a rotary indicator disk that has an active sector and an optoelectronic device comprising a sender and a receiver facing the disk. The optical signal received by the receiver is processed to deduce movement of the disk according to whether the signal emitted by the sender is reflected by said active sector or not.

FIG. 1 shows one embodiment of an optoelectronic device 6 of the above kind comprising a sender 1 and a receiver 2.

The sender 1 comprises:
a light-emitting diode 3,
a resistor Re, and
a pulsed voltage source Px.

The resistor Re is connected at one end to the supply Px and at the other end to the anode of the diode 3.

The cathode of the diode 3 is connected to ground.

The receiver 2 comprises:
a resistor Rr,
a photodiode 4,
a voltage source Vdd,
a resistor Rth1,
a resistor Rth2, and
an operational amplifier 5.

The voltage source Vdd is a lithium battery producing a voltage of 3 V or 3.6 V, for example.

A voltage pulse Px of value Vdd is generated every 50 ms, for example. This generates a current pulse through the light-emitting diode 3 to generate a light pulse. The current pulse is generated by a voltage Ve across the resistor Re and equal to Vdd−Vde where Vde is the substantially constant bias voltage across the diode 3.

In the event of reflection R of the light pulse by the active sector, the photodiode 4 receives said reflected light pulse, which is converted into a current Ir in the resistor Rr and therefore produces a voltage Vr across the resistor Rr.

The voltage Vr is compared to a threshold voltage Vth set by the divider bridge formed by the resistors Rth1 and Rth2 and the operational amplifier 5 supplies at its output a voltage representative of reception of the light by the photodiode 4.

The use of a device of the above kind gives rise to certain difficulties, however.

The voltage source Vdd may vary significantly because of various parameters such as temperature and aging, and the use of a high current pulse for other applications can significantly reduce the voltage Vdd. The variation of the voltage Vdd may be as high as 20%.

The substantially constant bias voltage Vde across the diode 3 is 1 V or 1.5 V, for example. The energy transferred to the receiver is proportional to Vdd−Vde. Thus if the voltage Vdd varies by x %, the light energy emitted varies by more than x %.

Accordingly, if the voltage Vdd is 3 V and the voltage Vde is 1.5 V, a 20% variation of the voltage Vdd leads to a 40% variation of the light energy transmitted.

This kind of variation of the light energy transmitted, which is not directly proportional to but greater than the variation of the voltage Vdd, makes it extremely difficult to set the threshold voltage Vth. The closer the voltage Vde is to the voltage Vdd, the greater this variation.

The present invention aims to provide an optoelectronic device for an optical detector module of a meter including a sender for generating a light pulse whose variation depends directly on the variation of the voltage supply.

SUMMARY OF THE INVENTION

To this end the present invention proposes an optoelectronic device for use in an optical detector module of a meter comprising a rotary member having a reflective sector, said device comprising:
a voltage edge source,
a sender comprising a light-emitting diode emitting a light pulse in response to a current pulse,
a receiver, and
a voltage source, in which device said sender comprises a capacitor and a resistor connected on one side to said voltage source and said capacitor is connected on one side to said voltage edge source and on the other side to the other side of said resistor and to the anode of said light-emitting diode.

Thanks to the invention, the resistor serves as the bias resistor of the light-emitting diode. Accordingly, in the absence of a voltage edge, the light-emitting diode is biased to its bias voltage via the resistor connected to the voltage source. The resistance of this resistor is made sufficiently high to bias the diode with a low forward current so that it substantially does not emit. When a voltage edge is generated in the voltage Vdd, energy equal to the product of the voltage Vdd by the value of the capacitor is then supplied to the light-emitting diode, which generates a light pulse having a luminous energy equal to the product of the voltage Vdd by the value of the capacitor. This light energy is therefore proportional to the voltage Vdd and a variation of the voltage Vdd will lead to an identical variation of the light energy transmitted.

Moreover, the light pulse is generated entirely by a voltage edge, and not by a pulse, as in the FIG. 1 device. There is therefore no utility in generating a voltage pulse having a particular duration.

Also, the energy transmitted is independent of the bias voltage of the light-emitting diode; as this may also vary, it is beneficial to obtain a transmitted energy independent of such variation.

The resistance of the resistor is advantageously selected to bias the diode whilst maintaining a low forward current in the diode.

In one particularly advantageous embodiment the receiver comprises:
a comparator for comparing the input voltage of the receiver and a threshold voltage, and an adjustment capacitor the charge in which sets the value of the threshold voltage.

It is therefore easy to set the threshold voltage, which may depend to a very great extent on the spread of the optoelectronic components used, such as the sender light-emitting diode. The adjustment facility enables adjustment of the threshold voltage if the ratio between the high level and the low level of the comparator is not sufficiently large. The threshold voltage is obtained by precharging the adjustment capacitor for a predetermined time. In the prior art device shown in FIG. 1, the threshold voltage is set by a resistor bridge and modification of the threshold voltage entails a high overcost through the need to add new resistors.

The latter embodiment of the optoelectronic device advantageously comprises means for generating a current through the adjustment capacitor for a particular time.

The means for generating a current advantageously comprise a microcontroller.

The receiver advantageously comprises a charging resistor, the comparator advantageously has an inverting input and a non-inverting input, and the adjustment capacitor is advantageously connected on one side to the inverting input and the charging resistor is advantageously connected on one side to the inverting input.

The receiver advantageously comprises auto-adaptation means for adjusting the value of the threshold voltage to the value of the input voltage in the presence of the light pulse.

It is particularly advantageous if the receiver comprises a photodiode and a capacitor for storing the energy transferred by the photodiode.

Accordingly, the light pulse emitted by the sender may be relatively short, of the order of a few microseconds; this limits power consumption. It suffices to choose a pulse duration sufficient to charge the storage capacitor. In the prior art device shown in FIG. 1, the voltage across the resistor Rr is accessible only during the light pulse, which must therefore be of sufficient duration to allow adequate processing of the signal.

In this latter embodiment, the receiver advantageously comprises a comparator having an inverting input and a non-inverting input and the non-inverting input is connected to the anode of the photodiode and to one side of the storage capacitor.

The comparator is an operational amplifier, for example.

Other features and advantages of the present invention will become apparent in the course of the following description of one embodiment of the invention, which is provided by way of illustrative and non-limiting example.

DETAILED DESCRIPTION OF THE PREFERRED EMBODIMENT

Figure 1:
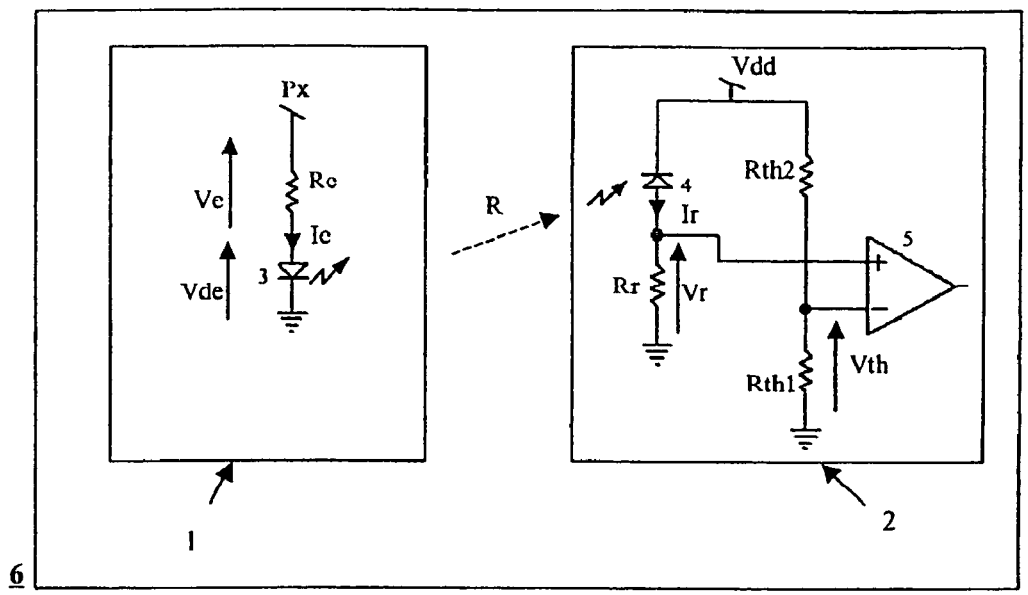
FIG. 1 shows a prior art optoelectronic device.

FIG. 1 has already been described in relation to the prior art.

Figure 2:
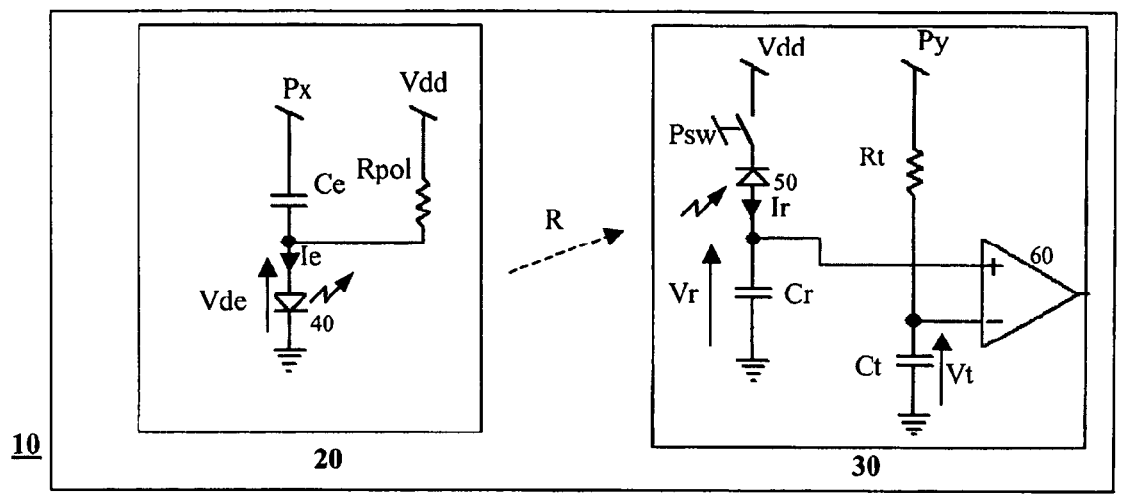
FIG. 2 shows an optoelectronic device of the invention.

FIG. 2 shows an optoelectronic device 10 of the invention comprising a sender 20 and a receiver 30.

The sender 20 comprises:
a light-emitting diode 40,
a resistor Rpol,
a voltage edge source Px,
a capacitor Ce, and
a voltage source Vdd such as a lithium battery (3 V or 3.6 V).

The capacitor Ce is connected on one side to the voltage edge source Px and on the other side to the anode of the diode 40.

The cathode of the diode 40 is connected to ground.

The resistor Rpol is connected on one side to the voltage source Vdd and on the other side to the anode of the diode 40.

The receiver 30 comprises:
an operational amplifier 60 having an inverting input and a non-inverting input,
a microcontroller Py,
an adjustment capacitor Ct,
a resistor Rt,
a storage capacitor Cr,
a photodiode 50,
a switch Psw, and
the voltage source Vdd.

The resistor Rt is connected on one side to the microcontroller Py and on the other side to the inverting input of the operational amplifier 60.

The adjustment capacitor Ct is connected on one side to ground and on the other side to the inverting input of the operational amplifier 60.

The switch Psw is connected on one side to the voltage source Vdd and on the other side to the cathode of the photodiode 50. The switch Psw is optional and may be replaced by a short circuit. The function of the switch Psw is to disconnect the receiver 30 from the voltage source Vdd if the sender 20 is not operating.

The anode of the photodiode 50 is connected to the non-inverting input of the operational amplifier 60 and to one side of the storage capacitor Cr, the other side of which is connected to ground.

In the absence of a voltage edge at Px, the resistor Rpol biases the diode 40 to its forward voltage Vde. The resistance of the resistor Rpol is made sufficiently high to bias the diode to the voltage Vde without it emitting light.

Because there is no voltage edge at Px, the capacitor Ce is biased between 0 V and Vde.

If a voltage edge of value Vdd is emitted at Px, energy corresponding to the product Vdd×Ce is transferred to the light-emitting diode 40, which generates a light pulse.

Consequently, the light energy emitted is directly proportional to the supply voltage Vdd. Accordingly, if Vdd varies by x %, the light energy also varies by x %.

In the event of reflection R of the light pulse by the active sector, the photodiode 50 receives the reflected light pulse, which is converted into a current Ir. The duration of said light pulse may be very short, of the order of a few microseconds. It is sufficient for the current Ir to charge the capacitor Cr. Thus the input voltage Vr of the receiver 30 is stored across the capacitor Cr. The voltage Vr can be processed when the light pulse is no longer present.

The operational amplifier then compares the voltage Vr to a threshold voltage Vt.

The threshold voltage Vt is obtained by precharging the capacitor Ct for a predefined time Tt. Precharging may be carried out using the microcontroller Py feeding the resistor Rt in series with the capacitor Ct for the time Tt.

The advantage of the above kind of circuit for charging the capacitor Ct lies in programmable, effective and economic adjustment of the threshold voltage with a high resolution, generally provided by the clock of the microcontroller Py.

Another advantage of this charging circuit is its analog to digital conversion of the received light. The time necessary to charge the capacitor Ct, which is initially discharged, before Vt reaches Vr may also be measured. The microcontroller can then determine the precise value of Vr and then execute auto-adaptation of the value of Vt to that of Vr.

Of course, the invention is not limited to the embodiment that has just been described.

Thus the comparator described is an operational amplifier, but may be replaced with any type of comparator.

There is claimed:

1. An optoelectronic device comprising:
    a voltage edge source:
    a sender having a light-emitting diode emitting a light pulse in response to a current pulse;
    a receiver; and
    a voltage source, in which device said sender has a capacitor and a resistor connected on one side to said voltage source and said capacitor is connected on one side to said voltage edge source and on the other side to the other side of the resistor and to the anode of said light-emitting diode, the resistance of said resistor being selected to bias said diode whilst maintaining a low forward current in said diode and the light pulse emitted from the light-emitting diode being proportional to the voltage supplied by said voltage source.

2. The optoelectronic device claimed in claim 1, wherein said receiver further comprises:
    a comparator for comparing the input voltage of said receiver at a threshold; and
    an adjustment capacitor the charge in which sets the value of said threshold voltage.

3. The optoelectronic device claimed in claim 2, further comprising means for generating a current through said adjustment capacitor for a particular time.

4. The optoelectronic device claimed in claim 2, wherein said receiver comprises a charging resistor, said comparator has an inverting input and a non-inverting input, and said adjustment capacitor is connected on one side to said inverting input and said charging resistor is connected on one side to said inverting input.

5. The optoelectronic device claimed in claim 3, wherein said means for generating current comprise a microcontroller.

6. The optoelectronic device claimed in claim 2, wherein said receiver comprises auto-adaptation means for adjusting the value of said threshold voltage to the value of said input voltage in the presence of said light pulse.

7. The optoelectronic device claimed in claim 1, wherein said receiver comprises a photodiode and a capacitor for storing the energy transferred by said photodiode.

8. The optoelectronic device claimed in claim 7, wherein said receiver comprises a comparator having an inverting input and a non-inverting input and said non-inverting input is connected to the anode of said photodiode and to one side of said storage capacitor.

* * * * *